United States Patent
Bryant

[19]

[11] Patent Number: 5,943,808
[45] Date of Patent: Aug. 31, 1999

[54] FISH POLE ALARM MECHANISM

[76] Inventor: Milledge Bryant, 3990 Ball Rd., Marion, N.Y. 14505

[21] Appl. No.: 08/963,441

[22] Filed: Nov. 3, 1997

[51] Int. Cl.$^6$ .................................................. A01K 97/12
[52] U.S. Cl. .................................................. 43/17
[58] Field of Search ........................................... 43/17, 16

[56] References Cited

U.S. PATENT DOCUMENTS

| | | | |
|---|---|---|---|
| 1,337,292 | 4/1920 | Timmons | 43/17 |
| 2,349,077 | 5/1944 | Comparelli | 43/17 |
| 2,409,988 | 10/1946 | Schwebs | 43/17 |
| 2,506,370 | 5/1950 | Leyda | 43/17 |
| 2,549,694 | 4/1951 | Leyda | 43/17 |
| 2,995,853 | 8/1961 | Ohliger | 43/17 |
| 3,074,196 | 1/1963 | Bronson | 43/17 |
| 3,280,496 | 10/1966 | London | 43/17 |
| 4,399,631 | 8/1983 | Smith | 43/17 |
| 4,507,890 | 4/1985 | Thorne | 43/17 |
| 4,541,195 | 9/1985 | Delaney | 43/17 |

*Primary Examiner*—Kurt Rowan
*Attorney, Agent, or Firm*—Shlesinger, Fitzsimmons & Shlesinger

[57] ABSTRACT

A fishing pole has a handle, a reel for supplying fishing line to the pole and a pair of normally closed switch contacts which project into a recess in the forward end of the handle where registering portions of the contacts are resiliently engaged with each other. The resiliently engaged portions of the contacts register with a slot which connects the recess to the exterior of the handle. A portion of the fishing line is disposed to be inserted manually through the slot and between the resiliently engaged portions of the contacts to effect temporary disengagement thereof during still-fishing with said pole. When a fish bite or strike causes the portion of the fish line to be withdrawn from between the normally engaged portions of the contacts, an alarm on the pole is energized to warn the person fishing.

12 Claims, 1 Drawing Sheet

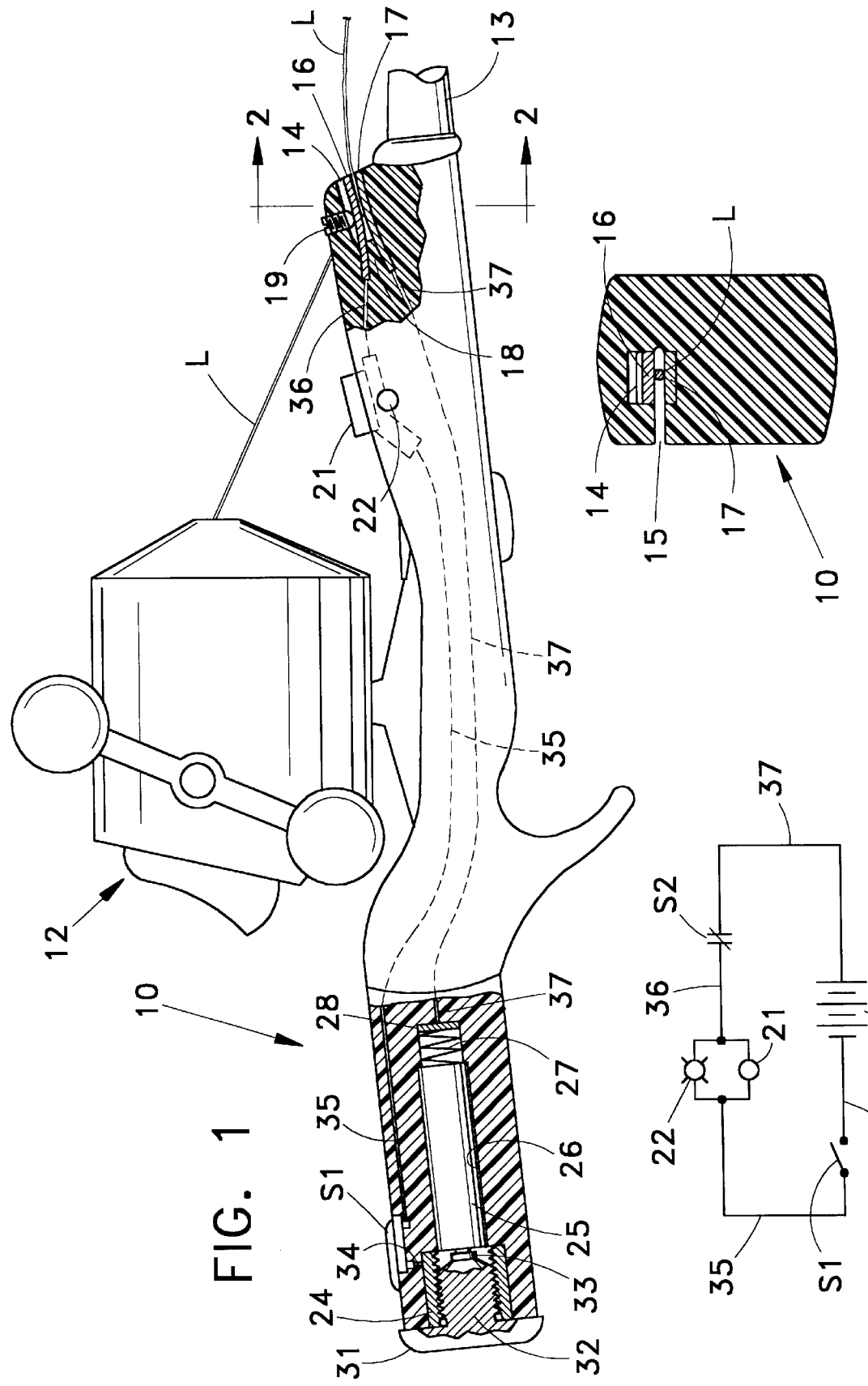

FISH POLE ALARM MECHANISM

BACKGROUND OF THE INVENTION

This invention relates to fishing poles, and more particularly to an improved pole of the type which has incorporated in the handle portion thereof an alarm mechanism which can be used to provide both audible and visual means for indicating when a fish has bitten or struck a baited line of a fishing pole.

There are currently available in the marketplace a number of fishing pole alarm devices, which can be utilized to trigger an alarm when the associated fishing line has been struck or otherwise bitten by a fish. U.S. Pat. No. 5,396,726, for example, discloses a fish bite indicator which can be releasably attached to a fishing pole, and which has projecting laterally therefrom an alarm operating arm. The fishing line extends intermediate its ends to a loop in the outer end of the arm, so that when the line is suddenly drawn taught in response to a strike or bit by a fish, the arm is moved far enough to actuate both a lamp and a beeper device located in the alarm housing, thus to place the fisherman on notice that a fish has struck the baited line. U.S. Pat. No. 5,450,687 discloses a variation of this type of arm-actuated alarm, but the alarm device is not attached to the fishing pole, but instead to a so-called bank stick which is fixed to one end of the ground and at the opposite end to the fishing rod. U.S. Pat. Nos. 5,088,223, 5,261,180, 5,274,943 and Des.281,805 disclose still other variations of a fishing line bite indicator, but in each case the indicator mechanism constitutes a separate housing or device which is releasably secured to an associated fishing pole.

One of the major disadvantages of prior such fish bite indicators is that the housings that are attached to the fishing pole are subject to damage during use, and also are subject to possible damage because of exposure to the elements. Moreover, particularly in those cases where the fishing line is passed through a loop or projection which extends from a fishing pole, or the alarm housing, the alarm often is accidentally triggered by simple movement of the fishing pole.

Accordingly, it is an object of this invention to provide an improved fishing pole alarm or bite indicator mechanism which is incorporated in an associated fishing pole, and preferably in the handle thereof.

Still another object of this invention is to provide a relatively simple and inexpensive fish bite indicator mechanism which can be incorporated readily into the handle of a fishing pole, and which does not require the use of any pivotal alarm elements which project laterally from the pole or the alarm mechanism itself.

Still other objects of this invention will be apparent hereinafter from the specification and from the recital of the appended claims, particularly when read in conjunction with the accompanying drawing.

SUMMARY OF THE INVENTION

The invention involves incorporating within the handle of a fishing pole, preferably forwardly of the reel which supplies the fishing line, a pair of elongate, metal switch contacts which are secured at their inner ends in the bottom of a recess which opens on the forward end of the handle. The forward or outer ends of the two contacts extend into the recess in registry with each other, and with a slot, which extends inwardly from one side of the handle and opens on the recess and the forward end of the handle. The two contacts are resiliently engaged with each other intermediate their ends, and the two forward ends thereof curve slightly away from each other. At least one of the contacts adjacent its forward end is pivotal slightly toward or away from the other contact, and normally is engaged intermediate its ends by the inner end of a tension adjusting screw, which threads into the handle selectively to increase or decrease the pressure with which the one contact is urged resiliently into engagement with the other contact.

These two normally closed switch contacts are connected in series with a manually operated switch, a conventional battery, and with a lamp and an audible warning device, such as a conventional buzzer, which are connected parallel with each other between the normally closed switch in the battery. The lamp, which may be a small bulb, is mounted in a recess in the handle to be visible by a person holding the pole; and the audible alarm or buzzer, is mounted in another recess in the handle adjacent the lamp. A battery is removably mounted in the recess in the outer end of the handle in such manner that when a battery is inserted into the handle, it is connected to a conventional, manually operable switch, which is also mounted on the handle, selectively to supply power to the normally closed switch contacts and the parallel-connected lamp and buzzer.

In use, the person fishing (still-fishing) first casts or otherwise places the lure or bait in the associated lake or stream to the desired depth and location. The operator then grasps the fishing line adjacent the discharge end of the reel and urges a bit of it laterally into the slot formed in the forward end of the handle, and in such manner that part of the line is forced between the normally-closed switch contacts. This causes the forward end of the one switch contact to be pivoted or otherwise urged away from the other contact thereby to retain that particular switch in a now-opened mode. The manually operable switch is then closed and the operator commences to await a strike or a bite by a fish. When such bite or strike occurs, the strain imparted to the fishing line by the fish causes the aforementioned portion of the fishing line to be drawn out of the slot in the forward end of the pole and from between the normally-closed switch contacts which then automatically close and immediately energize both the warning lamp and the buzzer, thereby to awaken, if need be, or otherwise to place the person fishing upon notice that a fish has struck or bitten the bait.

THE DRAWING

FIG. 1 is a fragmentary side view, partially in section, of a conventionally shaped fishing pole the handle of which has mounted thereon the usual fishing reel from one end of which extends a conventional fishing line;

FIG. 2 is a slightly enlarged fragmentary sectional view taken generally along the line 2—2 in FIG. 1 looking in the direction of the arrows, and FIG. 3 is a schematic wiring diagram illustrating one manner in which the associated switches and alarm devices of the fishing pole may be wired for operation.

PREFERRED EMBODIMENTS OF THE INVENTION

Referring now to the drawing by numerals of reference, 10 denotes generally a conventional plastic fishing pole handle having mounted thereon in a known manner a conventional fishing reel 12. Fishing line L is supplied from the forward end of reel 12 (the right end as shown in FIG. 1) to the rod or pole 13 which extends from part of the forward end of handle 10. Handle 10 has formed in its forward end adjacent rod 13, and extending slightly rearwardly from its forward end, an opening or recess 14 which is generally rectangular in cross section. Recess 14 communicates along one side thereof, the left side as shown in FIG. 2, with a transverse slot 15 which opens on one side of handle 10. Secured at their inner ends in registering recesses formed in the bottom of the opening 14, and extending at their opposite or outer ends into the opening 14 are two elongate, metal switch contacts 16 and 17. Contacts 16 and 17, which are curved intermediate their ends, are insulated from each other at their inner ends by a section 18 of the handle which extends between the inner ends of the contacts. However, the outer ends of the contacts 16 and 17, which extend into opening 14, have registering, curved surfaces which curve slightly away from each other, so that the outer ends of the contacts (the right ends of 16 and 17 as shown in FIG. 1) are slightly spaced from each other. However, intermediate their ends the confronting, curved surfaces of the contact 16 and 17, normally, as noted hereinafter, are disposed to be resiliently engaged with each other, thereby to effect a normally-closed switch denoted in FIG. 3 as switch S2.

If need be, the resilient force normally tending to close the two switch contacts 16 and 17 can be adjusted by means of a set screw 19, which is adjustably threaded into the upper surface of handle 10 to project at its inner end into engagement with contact 16 intermediate the ends thereof, thereby to adjust the force by means of which contact 16 normally tends to engage contact 17. Also, as shown for example more clearly in FIG. 2, while the lower contact 17 may normally remain motionless, the forward end of the upper contact 16 is free to pivot slightly in the opening 14 toward and away from contact 17.

Secured in a recess in the upper surface of the handle 10 rearwardly of the switch contacts 16 and 17 is a conventional, electrically operated buzzer or alarm 21 which, as noted hereinafter, is adapted to be energized by a conventional direct current battery. Also mounted in another recess in the handle 10 15 adjacent the buzzer 21 is a conventional light emitting element, such as a small, electrically operated bulb 22. Secured coaxially in a cylindrical recess formed in the rear end of the handle 10 remote from its front end, is a metal sleeve 24, the bore of which registers coaxailly with a reduced-diameter counterbore 26 formed in the bottom of the recess which accommodates the sleeve 24. At its inner end (the right end in FIG. 1) the bottom or negative end of the battery 25 is engaged with one end of a coiled compression spring 27 mounted in a counterbore in the bottom of counterbore 26. The bore containing spring 27 has secured in the bottom thereof a metal disc 28, against which is seated at the end of the metal spring 27 remote from the battery 25.

The battery 25 is removably secured in the bore 26 by a metal cap 31 having a reduced-diameter, externally threaded shank section 32, which is removably threaded into an internally threaded section of the metal sleeve 24. In this position, a reduced-diameter projection 33 on the inner end of the shank section 32 engages the positive terminal of the battery 25, and in such manner that the battery 25 is held seated against the bottom of the counterbore 26, thereby maintaining slight compressive force against the spring 27. Thus, when the battery 25 is secured by the cap 31 in the recess 26, a circuit is completed between the metal sleeve 24 and the metal disc 28 that is engaged by the spring 27.

To supply power from the battery 25 selectively to the buzzer 21 and lamp 22, the metal sleeve 24 is connected by a wire lead 34 to one terminal of a conventional ON/OFF switch, for example a single pole, single throw switch Si. The other terminal of switch Si is connected by a wire lead 35 to the input terminals of the buzzer 21 and lamp 22, which as shown in FIG. 3, are connected in parallel. The outputs of the lamps 21 and 22 are connected by a wire lead 36 to the contact 16 of switch S2; and the other contact 17 of switch S2 is connected by a wire lead 37 to plate 28, and hence to the negative terminal of battery 25.

In use, the battery Si is normally switched to its OFF position. The person involved in still-fishing with the fishing pole having the handle 10, manipulates the pole until the baited line L is cast or otherwise manipulated so that the baited end of the line L is placed in an adjacent body of water in a known manner. Once the bait or lure has reached the desired spot to allow commencement of still-fishing, the person holding the handle 10 grasps and shifts a portion of the line L in front of the reel 12 and pushes the portion through the slot 15 and into the space between the contacts 16 and 17, which then frictionally engage such portion of the line L to retain it between the two contacts, and thus separating and opening the otherwise normally-closed contacts 16 and 17. The operator then moves the switch SI to its ON position thus supplying power to the now-opened switch contacts and the parallel-connected buzzer 21 and lamp 22. As a consequence, if and when a fish strikes or otherwise bites the bait on the line L with sufficient tension to pull or otherwise cause the line L to be drawn out of the slot 15 from between the two contacts 16 and 17, those contacts close and immediately energize the buzzer 21 and lamp 22, thus placing the person fishing on notice that a bite or strike has occurred. The person fishing can then manipulate the associated fishing pole in the usual manner.

From the foregoing it will be apparent that the present invention provides a relatively simple and inexpensive means for using a small or tiny portion of the fish line L to trigger an audible and visible alarm whenever a strike or bite causes the small, detecting portion of the line to be withdrawn from between the switch contacts 16 and 17. The advantage of the above-noted detection system is that very few moving parts are involved, and the significant portions of the detection system are mounted within the handle of the fishing pole with only a tiny portion of the system exposed to the elements—namely, portions of the switch contacts 16 and 17 which extend into the opening or recess 14. Substantially all of the remaining elements of the detection system can be sealed within or on the handle 10. Also, in order to place the system in an operating mode, only two relatively simple steps are required—i.e., first inserting a small portion of the line L between the two contacts 16 and 17, and then moving switch 31 to its ON position.

While this invention has been illustrated and described in detail in connection with only certain embodiments thereof, it will be apparent that it is capable of still further modification. For example, instead of the entire forward end of recess 14 (the right end thereof as shown in FIG. 1) opening directly on the forward end of handle 10, it could terminate just short of the forward end of the handle and have a portion thereof opening through the slot 15 onto the forward end of the handle. Moreover, it will be apparent also that this application is intended to cover any such modifications as may fall within the scope of one skilled in the art, or the appended claims.

I claim:

1. In a fishing pole having a handle for manipulating the pole, and a reel for supplying fishing line to a rod section of the pole which projects from part of the forward end of the handle, an improved alarm mechanism, comprising an electrically operated alarm mounted on said handle, a power supply mounted in said handle, said handle having in its forward end adjacent said rod section an opening extending part way into the handle and communicating along one side thereof with a transverse slot which opens on one side of said handle, a pair of switch contacts each being secured at one end in said handle and projecting at its opposite end into said opening, at least a portion of said opposite end of one of said contacts normally being disposed in resilient engagement with a registering portion of said opposite end of the other of said contacts, said resiliently engaged portions of said contacts registering with said slot in said handle and disposed to have a portion of said fishing line inserted manually through said slot and between said resiliently engaged portions of said contacts to effect temporary disengagement thereof during still-fishing with said pole, and circuit means connecting said contacts between said power supply and said alarm and operative to cause said power supply to energize said alarm when a fish bite or strike causes said portion of the fish line to be withdrawn from between said normally engaged portions of said contacts.

2. In a fishing pole as defined in claim 1, including means on said handle for adjusting the force with which said portion of the opposite end of said one contact is normally resiliently engaged with said registering portion of said other contact.

3. In a fishing pole as defined in claim 1, wherein said alarm comprises an electric buzzer secured in said handle adjacent said contacts.

4. In a fishing pole as defined in claim 1, wherein said alarm comprises an electric bulb mounted in said handle to be visible, when illuminated, from the exterior of said handle.

5. A fishing pole as defined in claim 1, wherein said opposite ends of said contacts extend through said opening toward the forward end of said handle, and said opposite end of said one contact curves slightly away from said opposite end of said other contact.

6. In a fishing pole as defined in claim 1, wherein said power supply comprises a battery removably mounted in a recess in the end of said handle remote from said forward end thereof.

7. In a fishing pole as defined in claim 6, wherein said circuit means includes, a control switch connected in series with said battery, said alarm, and said switch contacts, and movable between an open position in which it prevents operation of said alarm when said registering portions of said switch contacts are resiliently engaged, and a closed position in which said alarm is energized when said registering portions of said contacts are engaged, and manually operable means on said handle for moving said control switch between its open and closed positions, respectively.

8. In a fishing pole as defined in claim 7, wherein said alarm comprises an electric buzzer and electric bulb connected in parallel with each other between said switch and said contacts.

9. In a fishing pole having a handle for manipulating the pole, a reel for supplying fishing line for the pole, and an electrical alarm disposed to be energized during still-fishing with the pole when a sudden fish bite or strike causes the fishing line to be drawn taut, an improved mechanism for controlling the alarm, comprising a first, manually operable switch mounted on said handle for movement manually between open and closed positions, respectively, a second, normally-closed switch mounted in said handle and connected in series with said alarm and said first switch, and a battery removably mounted in a first recess formed in said handle adjacent one end thereof, and operative to effect energization of said alarm when said first and second switches are closed, said normally-closed switch comprising a pair of switch contacts each of which projects at one end thereof into a second recess formed in said handle adjacent the opposite end thereof, said one end of one of said pair of contacts normally having a portion thereof resiliently engaged with a registering portion of said one end of the other of said contacts, and said handle having therein a slot opening at one side thereof on the exterior of said handle adjacent one side thereof, and opening at its opposite side on said second recess, and in registry with said normally engaged portions of said contacts, and said resiliently engaged portions of said contacts being disposed to have a portion of said fishing line inserted manually through said slot in said handle and between said resiliently engaged portions to effect temporary disengagement thereof during still-fishing with said pole.

10. In a fishing pole as defined in claim 9, including means on said handle for adjusting the force with which said portion of said one end of said one contact is normally resiliently engaged with said registering portion of said other contact.

11. In a fishing pole as defined in claim 9, wherein said slot opens at one end thereof on said opposite end of said handle.

12. In a fishing pole as defined in claim 9, wherein said second recess opens at one end thereof on said opposite end of said handle, and said one ends of said contacts are curved slightly away from each other.

* * * * *